US011251612B2

(12) United States Patent
Blug

(10) Patent No.: US 11,251,612 B2
(45) Date of Patent: Feb. 15, 2022

(54) METHOD AND ARRANGEMENT FOR DETERMINING MEASUREMENT LOCATIONS IN AN ENERGY GRID

(71) Applicant: SIEMENS AKTIENGESELLSCHAFT, Munich (DE)

(72) Inventor: Christian Blug, Quierschied (DE)

(73) Assignee: Siemens Aktiengesellschaft, Munich (DE)

( * ) Notice: Subject to any disclaimer, the term of this patent is extended or adjusted under 35 U.S.C. 154(b) by 1424 days.

(21) Appl. No.: 15/236,599

(22) Filed: Aug. 15, 2016

(65) Prior Publication Data

US 2017/0046457 A1 Feb. 16, 2017

(30) Foreign Application Priority Data

Aug. 14, 2015 (EP) ..................................... 15181070

(51) Int. Cl.
*H02J 3/00* (2006.01)
*G06F 30/18* (2020.01)
*G06F 113/04* (2020.01)

(52) U.S. Cl.
CPC ............... *H02J 3/00* (2013.01); *G06F 30/18* (2020.01); *G06F 2113/04* (2020.01); *H02J 2203/20* (2020.01); *Y02E 60/00* (2013.01); *Y04S 40/20* (2013.01)

(58) Field of Classification Search
CPC ....... H02J 3/00; H02J 2003/007; Y02E 60/76; Y02E 40/22
See application file for complete search history.

(56) References Cited

U.S. PATENT DOCUMENTS

| 7,519,506 B2 * | 4/2009 | Trias ......................... H02J 3/00 703/18 |
| 9,099,868 B2 * | 8/2015 | Taft .......................... H02J 3/00 |
| 2009/0276170 A1 * | 11/2009 | Bickel ....................... H02J 3/00 702/58 |

(Continued)

OTHER PUBLICATIONS

Xiang, Y., et al. "Optimization of State-Estimator-Based Operation Framework Including Measurement Placement for Medium Voltage Distribution Grid" IEEE Transactions on Smart Grid, vol. 5, No. 6 (2014) (Year: 2014).*

(Continued)

*Primary Examiner* — Jay Hann
(74) *Attorney, Agent, or Firm* — Laurence A. Greenberg; Werner H. Stemer; Ralph E. Locher

(57) ABSTRACT

A method determines measurement locations in an energy grid. In the energy grid, use is made of a controllable device for wide-range voltage control. A model of the energy grid is provided which specifies a voltage distribution within the energy grid by a system of equations and/or a system of inequalities depending on the control position of the controllable device. A simulation for minimizing the number of measurement locations is carried out on the basis of the model, and in that as a result of the simulation a minimum number and the respective position of measurement locations and also the control position of the controllable device are specified in order that the energy grid complies with a predefined voltage band during operation.

12 Claims, 2 Drawing Sheets

(56) References Cited

U.S. PATENT DOCUMENTS

2015/0088439 A1* 3/2015 Coffrin .................. H02J 3/00
702/60
2016/0099566 A1* 4/2016 Murphy .................. H02J 3/50
700/298

OTHER PUBLICATIONS

Oerter, C. & Neusel-Lange, N. "LV-Grid Automation System—A Technology Review" IEEE PES Conf. (2014) (Year: 2014).*

Janssen, P., et al. "Meter Placement Impacton Distribution System State Estimation" 22nd Int'l Conf. on Electricity Distribution, paper No. 627 (2013) (Year: 2013).*

Ramesh, L., et al., "Planning Optimal Intelligent Metering for Distribution System Monitoring and Control", 2008, pp. 218-222, INDICON 2008; Annual IEEE, IEEE, Piscataway, NJ.

Bahabadi, H.B., et al., "Optimal Placement of Phasor Measurement Units for Harmonic State Estimation in Unbalanced Distribution System Using Genetic Algorithms", 2011, pp. 100-105, 21st International Conference on Systems Engineering.

Liu, J, et al., "Optimal Meter Placement for Robust Measurement Systems in Active Distribution Grids", 2014, pp. 1096-1105, vol. 63, No. 5, IEEE Transactions on Instrumentation and Measurement, IEEE Service Center, Piscataway, NJ, USA.

Jie, W., et al., "Meter placement for load estimation in radial power distribution systems", 2004, pp. 916-919, vol. 5, Proceedings / 2004 IEEE International Symposium on Circuits and Systems, IEEE Operations Center, Piscataway, NJ, USA.

Muscas, C., et al., "Optimal Placement of Measurement Devices in Electric Distribution Systems", 2006, pp. 1873-1878, IMTC 2006—Instrumentation and Measurement Technology Conference, Sorrento, Italy, Apr. 24-27, 2006.

Abdelsalam, H., et al., "Impact of Distribution System Reconfiguration on Optimal Placement of Phasor Measurement Units", 2014, pp. 1-6, 2014 Clemson University Power Systems Conference.

Nusrat, N., et al., "Novel Meter Placement Algorithm for Enhanced Accuracy of Distribution System State Estimation", 2012, pp. 1-8, IEEE Power and Energy Society General Meeting, San Diego, CA, USA.

Yu, X., et al. "Optimization of State-Estimator-Based Operation Framework Including Measurement Placement for Medium Voltage Distribution Grid", 2014, pp. 2929-2937, vol. 5, No. 6, IEEE Transactions on Smart Grid.

* cited by examiner

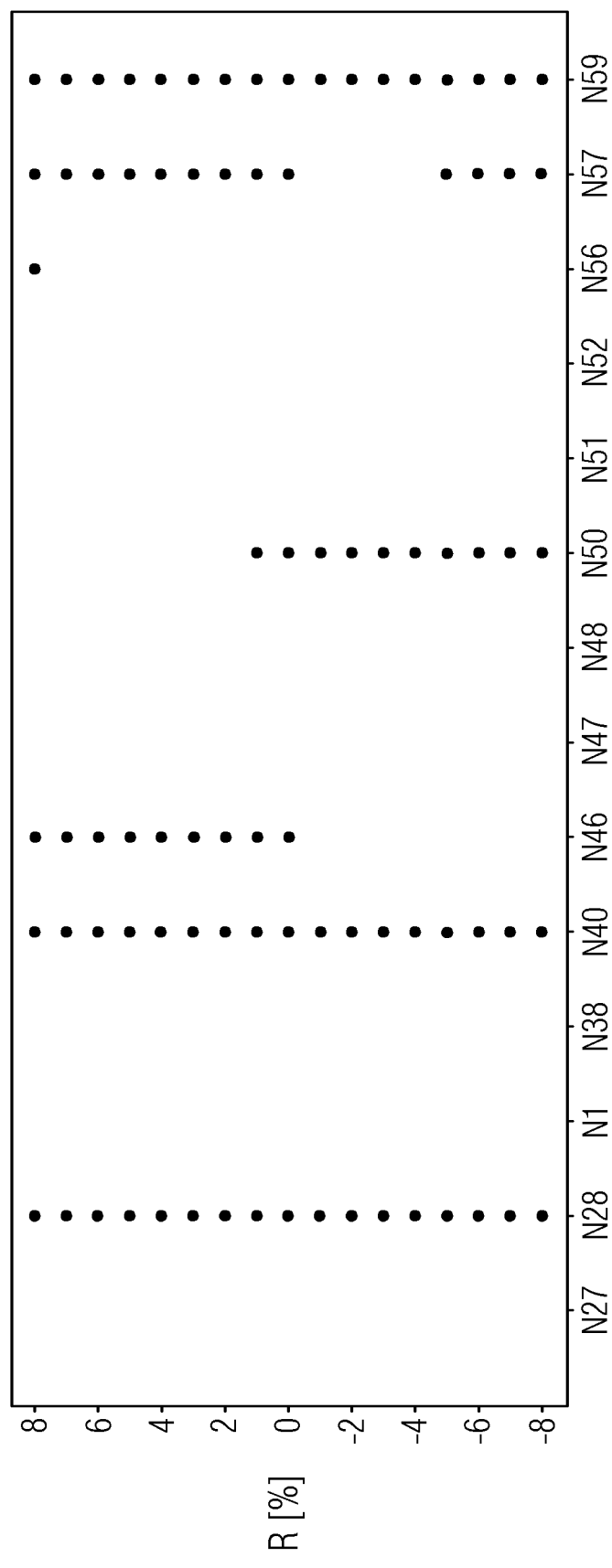

METHOD AND ARRANGEMENT FOR DETERMINING MEASUREMENT LOCATIONS IN AN ENERGY GRID

CROSS-REFERENCE TO RELATED APPLICATION

This application claims the priority, under 35 U.S.C. § 119, of European application EP 15181070.2, filed Aug. 14, 2015; the prior application is herewith incorporated by reference in its entirety.

BACKGROUND OF THE INVENTION

Field of the Invention

The invention relates to a method for determining measurement locations in an energy grid, and to a corresponding arrangement.

European patent application No. 15 178 794.2, which was filed on Jul. 29, 2015, is concerned with a method for retrofitting an electrical energy grid and also methods for optimizing an existing electrical energy grid. The description, the figures and the equations in the application are herewith incorporated by reference as part of the disclosure of the present patent application.

In the patent application cited above, a mathematical model of the energy grid is provided which takes account of a voltage distribution within the energy grid by a system of equations and/or system of inequalities depending on the number and position of additional controllable devices and also on control positions of all the controllable devices, and a simulation for minimizing a target function is carried out on the basis of the model. The target function takes account of retrofitting outlay and/or energy losses caused by the additional controllable devices, and as a result of the simulation the number and position of additionally required controllable devices and also the control positions of all the controllable devices are specified in order that the energy grid complies with a predefined voltage band during operation. In one variant, the mathematical model is developed further to the effect that a wide-range control of an existing energy grid can also be simulated in order to determine control positions of a substation transformer with which a predefined voltage band (generally +/−10% of the nominal voltage of the energy grid) can be complied with.

There is thus a possibility for complying with or monitoring compliance with the voltage limits in public grids having a greatly heterogeneous energy generator and energy consumer structure, in a wide-range control (WRC). In this case, the setting values for a tap switch of a substation transformer are determined on the basis of continuous operational voltage measurements at selected measurement points or measurement locations in the grid.

What is disadvantageous about the wide-range control is the costs associated therewith, and also the uncertainty as to whether the measurement locations determined previously by measurement in field trials and a subsequent lengthy measurement campaign are actually suitable. In particular, trying out measurement locations does not prove that with the measurement locations found all operating situations of the energy grid (e.g. high load or high decentralized feeding) can be adequately described in order to perform a secure and efficient WRC.

Proceeding from previous approaches in which measurement locations for a wide-range control were determined by experiments in the physical energy grid, the invention addresses the object of determining measurement locations for the wide-range control comparatively with low complexity and costs.

SUMMARY OF THE INVENTION

It is accordingly an object of the invention to provide a method and an arrangement for determining measurement locations in an energy grid that overcome the above-mentioned disadvantages of the prior art devices and methods of this general type.

One advantage of the method according to the invention is that, with the aim of avoiding unnecessary technical complexities and corresponding costs, a minimum quantity of measurement locations is determined in order to enable a complete WRC and at the same time to ensure compliance with a predefined voltage band, e.g. 90% to 110% of the nominal voltage.

In one preferred embodiment of the method according to the invention, during the simulation for all control positions of the controllable device and in each case for all nodes in the energy grid the following steps are repeated:
a) cancelling the condition in the system of equations and/or system of inequalities that a predefined voltage band must be complied with, for the respective node;
b) carrying out the simulation; and
c) adding the respective node to the set of the measurement locations required at a minimum, if the result of the simulation reveals that the predefined voltage band was violated at the respective node.

Nodes in the energy grid are, for example, connection points for grid branches, loads such as buildings or energy feeders such as photovoltaic installations.

If a node at which the voltage band is violated is involved, then this node must be monitored by a measurement location.

One advantage of this embodiment is that by a comparatively simple "combination throughout" of the necessity of a measurement location for all nodes, a minimum number of measurement locations can be determined rapidly and securely, which saves costs and installation outlay.

In one preferred embodiment of the method according to the invention, voltage measuring devices are in each case installed at the determined positions in the energy grid. This is an advantage because, during the operation of the energy grid, it is thus possible to carry out a wide-range control in which the entire grid can be constantly monitored for compliance with the predefined voltage band.

In one preferred embodiment of the method according to the invention, the controllable device is set to a control position which requires a minimum number of measurement locations in accordance with the result. This is an advantage because costs and outlay for unrequired measurement locations are saved and it is ensured that the entire energy grid can be monitored for voltage band violations.

In one preferred embodiment of the method according to the invention, a controllable substation transformer is used as the controllable device. This is an advantage because a wide-range control is often used in the case of transformers that transform a medium voltage into a low voltage.

It is particularly preferred if the substation transformer can change its control position dynamically, that is to say under load.

In one preferred embodiment of the method according to the invention, a controllable local grid transformer (CLGT) is used as the controllable device. This is an advantage because in this way a WRC of a partial energy grid disposed downstream of the CLGT can be carried out at the low-voltage level.

In one preferred embodiment of the method according to the invention, a grid controller is used as the controllable device. This is an advantage because in this way a WRC of a partial energy grid disposed downstream of the grid controller can be carried out, e.g. at the low-voltage level.

Furthermore, proceeding from previous approaches in which measurement locations for a wide-range control were determined by experiments in the physical energy grid, the invention addresses the object of providing an arrangement for determining measurement locations for the wide-range control which specifies measurement locations comparatively with low complexity and costs.

By way of example, a hardware component such as a computer device with suitable software can be used as the simulation device. The simulation device can also be configured as a pure software component and be suitable e.g. locally for application on a PC. Alternatively, the simulation device can also be configured as a cloud application.

For further elucidation of the invention, one preferred and advantageous embodiment of the invention is described in the following exemplary embodiment.

The following description discusses an energy grid with a dynamically controllable substation transformer and numerous nodes at a medium-voltage level or low-voltage level. The intention is to determine at what nodes in the grid measurement locations must be installed in order that operating states with high feeding of electrical energy—e.g. by photovoltaic installations—and also operating states with high load can be managed, without a predefined voltage band being violated at an arbitrary location in the energy grid.

The starting point of the solution approach is a linear, but complex load flow problem in accordance with $i=Y*u$ in a representation with the aid of the so-called system admittance matrix. In this case, the node vector i is decomposed into the partial currents $i_{G,i}$ for the generator contribution and $i_{L,i}$ for the load portion at the node i. Furthermore, the index w denotes the real part (active portion) and the index b denotes the imaginary part (reactive portion) of the complex voltage, or of the complex current. g and b correspondingly describe the conductance and susceptance of an element of the complex admittance matrix Y (equations 1 to 4).

This yields in each case a system of equations for the real and imaginary parts (equations 4, 5). This system of equations is to be solved with respect to the real and imaginary parts of the node voltages. The absolute value is then also to be linearized (equations 6 to 9).

In the case of a customary flat start ($u_{w,i,0}=u_n$ and $u_{b,i,0}=0$) the reactive power terms can be disregarded; the variable $u_{w,i}$ results as an approximate solution for the absolute value of the node voltage. The smaller the node angles of the exact solution, the more accurate the approximate solution is, too. The node currents in equations 4 and 5 are determined from the flat start voltages.

Solving the equations proceeds from a linear load flow that relates the complex node voltages to the complex node currents. Furthermore, at this juncture it is assumed for the sake of simplicity that the tap switch in the substation is the sole dynamic control element. Grid controllers present in the grid can be treated analogously in order thus to control a grid branch disposed downstream of the grid controller at the same voltage level by the method presented here. The same applies to controllable local grid transformers (CLGT) possibly present.

Those measurement locations are sought whose observation suffices to comply with the voltage conditions—e.g. +/−10% of the nominal voltage—for all operating situations. These operating states are all possible combinations of load and generator currents and all possible positions of the tap switch when complying with the predefined voltage band.

The load flow equations result from equations 4, 5 and 9. In this case, secondary conditions are intended to apply to each node current (equations 10, 11). In the present example, the predefined voltage band is intended to be 90% to 110% of the nominal voltage.

Since the node voltages are monitored by explicit measurement locations, equation 12 must apply to them.

It is assumed that the two extreme cases of max. load and max. generation can be managed with control positions in the substation transformer. At least one node current state which likewise complies with the voltage conditions and can therefore be managed then exists for all other tap switch positions. For all other node current states, the violation of the voltage band at a node i is penalized (equation 13).

The additive constant ε should be small in relation to the respective voltage limit. This guarantees that upon reaching a voltage limit of a node with defined voltage restriction in accordance with equation 12 other nodes with—governed topologically—identical voltage are not penalized.

Two optimization problems can then be formulated as a result. The respective target functions arise in accordance with equations 14 and 15.

If equation 14 is used as the target function, then the node currents are always chosen by optimization such that no voltage band violation arises. Such operating situations exist whenever the tap switch has a position between its extreme positions. Two definitions are also intended to be presented for determining the optimum measurement locations.

Definition 1: A grid node is called explicitly observable if compliance with the permissible voltage band at this node is guaranteed by the local measurement of its node voltage and the correction controlled thereby.

Definition 2: A grid node is called implicitly observable if compliance with the permissible voltage band at this node is guaranteed by the explicit observability of one or more other grid nodes and, therefore, no voltage measurement is required at the relevant node.

The aim of WRC planning must be, then, to minimize the number of required measurement locations and thus the number of explicitly observable grid nodes, without a voltage band violation of a grid node that is not measured directly arising here for an arbitrary load or generation case.

A check of implicit observability is afforded by equation 15.

An explicit measurement location becomes an implicit measurement location in the optimization problem by virtue of the fact that the secondary voltage condition according to equation 12 can be omitted at this grid node, without the voltage at this node being able to reach impermissible values. By maximizing the target function, the optimization then determines that current vector for which—if the latter exists—the voltage conditions are violated. If the target function has the value zero even upon omission of the voltage condition, then the grid node is implicitly observable. This results in the following algorithm:

$\Omega=\{\ \}$

For all control positions r from $\{r_{min}, \ldots, r_{max}\}$ of the voltage controller in the substation, the following steps are repeated:

Solution set $\Omega=\{\ \}$

For all nodes i of the grid the following is repeated:

Remove secondary voltage condition 12

Solve optimization problem equation 15

For O>0, $\Omega_r=\Omega_r \cup \{i\}$, re-establish condition or
For O≤0, grid node is implicitly observable This results in the solution set $\Omega=\Omega_{r,min} \cup \ldots \cup \Omega_{r,max}$.

The solution set then contains all nodes which must be explicitly observable for all intermediate operating situations and thus require a dedicated voltage monitoring. The partial optimization problems are linear and have, in the load flow equations, continuous variables that are supplemented by binary variables for absolute value formation. These problems can thus be solved by the methods of mixed integer optimization, such as are known e.g. from the book "Angewandte Optimierung" ["Applied Optimization"] by Jozsef Varga, 1991.

The computational complexity for the outer iteration (step 1. in the algorithm) and the inner iteration (step 3. in the algorithm) grows only proportionally with the number of control stages or the number of potential measurement locations to be examined. The calculation complexity can be minimized for the solution of the system of equations according to equation 15 if termination is effected after the determination of the first solution that occurs with a target function value 0 greater than 0. The method therefore yields the optimum measurement location topology for the WRC within the scope of the model accuracy of the linear load flow calculation.

Other features which are considered as characteristic for the invention are set forth in the appended claims.

Although the invention is illustrated and described herein as embodied in a method and an arrangement for determining measurement locations in an energy grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is an illustration showing an overview of measurement locations evaluated by a method according to the invention in the energy grid in accordance with FIG. 1.

DETAILED DESCRIPTION OF THE INVENTION

Figure 1:
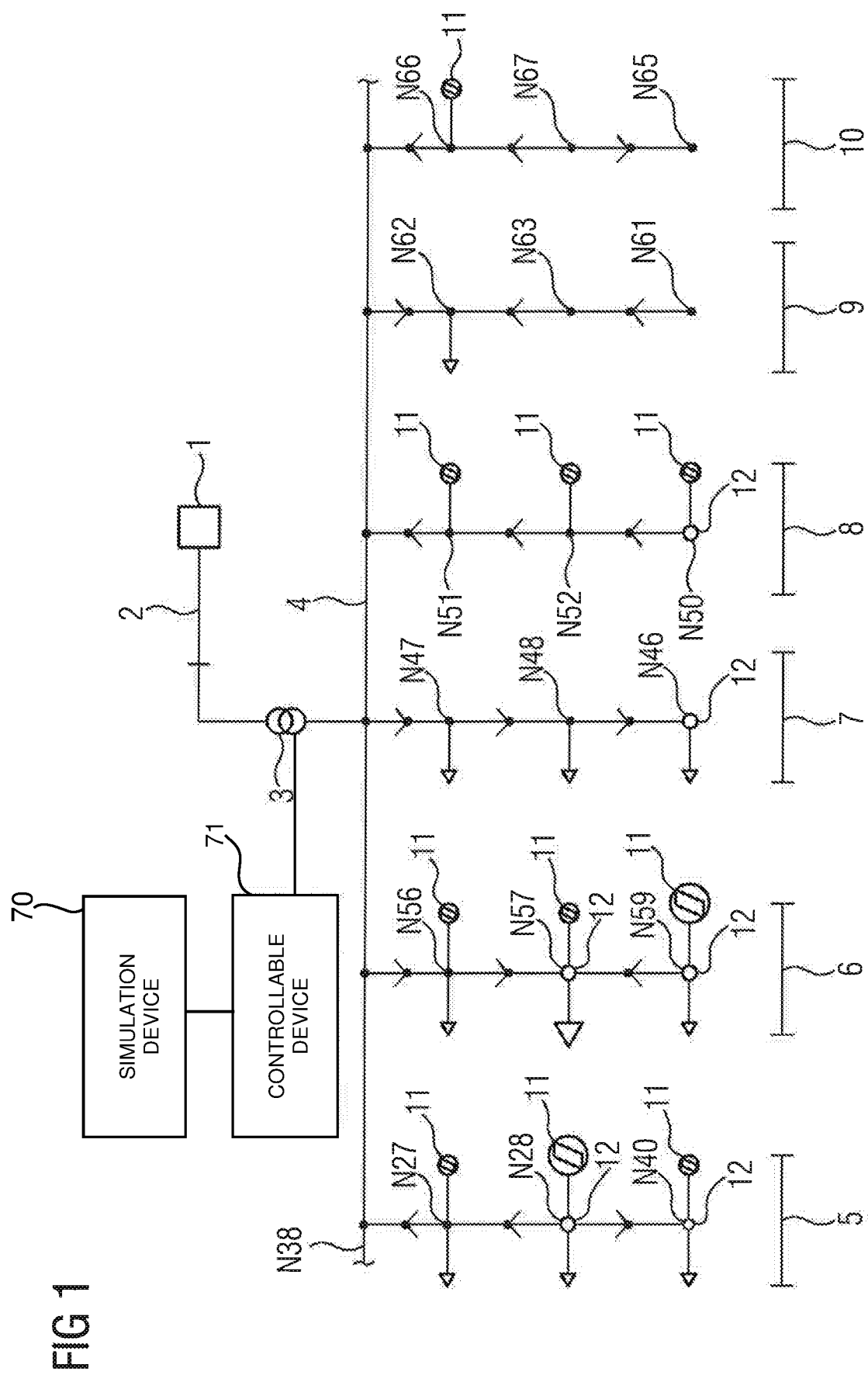
FIG. 1 is an illustration showing an example of an energy grid.

Referring now to the figures of the drawings in detail and first, particularly to FIG. 1 thereof, there is shown an example of an energy grid with a medium-voltage source 1 (a grid connection) and a low-voltage transformer 3, which is controllable in stages from −8% to +8% of the nominal voltage of a low-voltage level 4U a simulation device 70, and a further controllable device 71.

The exemplary grid has nodes N at which e.g. outgoing sections—marked by arrows—as loads and feeding devices 11 for electrical energy, which are represented by solar modules, are present.

The illustration shows six grid branches 5, 6, 7, 8, 9, 10 having different characteristic loadings.

Grid branch 5: Outgoing section having heterogeneous composition of generation and consumption.

Grid branch 6: Outgoing section having heterogeneous composition of generation and consumption.

Grid branch 7: Outgoing section having homogeneous loading.

Grid branch 8: Outgoing section having homogeneous feeding.

Grid branch 9: Outgoing section having small homogeneous loading.

Grid branch 10: Outgoing section having small homogeneous generation.

The voltage measurement locations 12 determined by means of the optimization are marked by nodes depicted with greater thickness in the grid plan. These are the nodes N28, N40, N57, N59, N46, N50.

For the grid branches 9 and 10, therefore, the application of the optimization yields no required measurement locations, since here evidently the voltage conditions cannot be violated owing to the smallness of the connected loads and generators and the nodes in these branches can be monitored implicitly by observation of nodes in the other branches.

In the case of the grid branches 7 and 8, owing to the homogeneity of the connected loads and feeding arrangements, the monitoring of the respective last grid node in the path section suffices also for monitoring all other grid nodes of the path section.

In the case of the grid branches 5 and 6 the situation is somewhat more difficult: the sizes of the load and generator symbols represent the magnitude of the respective currents. In this regard, in the grid branch 6 it can happen that the node N59 must be observed on account of the voltage rise. By contrast, the node N57 may have the lowest node voltage if low load and high feeding occur simultaneously at the node N59. Consequently, the voltage must be monitored at this node as well.

The opposite situation prevails in the grid branch 5: here the node N40 must be monitored on account of the load. However, the case may also occur where, with predominant load at N40 and predominant feeding at N28, the upper voltage limit is exceeded, such that this node must likewise be monitored.

FIG. 2 illustrates an overview of the measurement locations evaluated by the method according to the invention in the energy grid in accordance with FIG. 1. On the horizontal axis, a respective vertical line is imagined for the nodes N. The vertical axis indicates, for each control position R of the substation transformer, by how many percent the nominal voltage was decreased or increased. In this case, for each stage (percentage deviation R) a horizontal line is imagined along which arises a grid of crossing points which can be either implicitly or explicitly observable. Explicitly observable load voltages are present if a crossing point is marked by a dot. These nodes must be monitored by measurement locations. The fewer dots there are on a horizontal line, the fewer measurement locations are thus required.

If the controllable device such as e.g. a controllable substation transformer is operated with a neutral tap position, that is to say a deviation of R=0% from the nominal current, then this results in the six measurement locations N28, N40, N57, N59, N46, N50 already depicted in FIG. 1.

The overview shows that in the case of a set stage in the substation transformer of −1% to −4%, only four measurement locations must be observed by measuring devices, namely N28, N40, N50 and N57. In the exemplary grid it would thus be optimal to set the substation transformer from −1% to −4%. By virtue of saving two measurement locations in the exemplary grid, it is possible to save corresponding costs for installation, maintenance and monitoring.

The different character of the grid nodes N46 and N50 is shown clearly here: On account of the load character of N46 no measurement is required at relatively high voltage setpoint values (negative control stages), while in the outgoing section N50, characterized by generators, monitoring is necessary precisely in such cases. Consequently, a total of 6 nodes must be monitored if the intention is to pass through a control range of 94% to 106% (−6% to 6%). The minimum number of four measurement locations is required in the case of a voltage control range of 101% to 104%.

If appropriate, in the context of feeding management, it is necessary to limit feeders in the path sections of the nodes N28, N46, N50 and N59 if the upper limit values are reached in these path sections.

Further dynamic voltage control devices such as controllable local grid transformers (CLGT) can be taken into account approximately by virtue of the fact that, for all nodes in the region in proximity to these elements, not only is the voltage condition relinquished, but also the penalization term is set to zero. This corresponds to the assumption that the control device can fulfill the control task to the greatest possible extent independently of the tap switch position in the substation.

The equations underlying the solution according to the invention are listed below. In this case, the numbering of the equations corresponds to the numbering in the description above.

Equations:

$$i_{G,i} - i_{L,i} = (u_{w,i} + ju_{b,i})(g_{i,i} + jb_{i,i}) + \sum_{j \neq i}(g_{i,j} + jb_{i,j})(u_{w,j} + ju_{b,j}) \quad (1)$$

$$= u_{w,i}g_{i,i} - u_{b,i}b_{i,i} + j(u_{b,i}g_{i,i} + u_{w,i}b_{i,i}) - \sum_{j \neq i}((g_{i,j}u_{w,j} - b_{i,j}u_{b,j}) + j(b_{i,j}u_{w,j} + g_{i,j}u_{b,j})) \quad (2)$$

$$= u_{w,i}g_{i,i} - u_{b,i}b_{i,i} + \sum_{j \neq i}(g_{i,j}u_{w,j} - b_{i,j}u_{b,j}) + j(u_{b,i}g_{i,i} + u_{w,i}b_{i,i}) + \sum_{j \neq i}j(b_{i,j}u_{w,j} + g_{i,j}u_{b,j}) \quad (3)$$

$$i_{w,G,i} - i_{w,L,i} = u_{w,i}g_{i,i} - u_{b,i}b_{i,i} + \sum_{j \neq i}j(g_{i,j}u_{w,j} - b_{i,j}u_{b,j}) \quad (4)$$

$$i_{b,G,i} - i_{b,L,i} = u_{b,i}g_{i,i} - u_{w,i}b_{i,i} + \sum_{j \neq i}j(b_{i,j}u_{w,j} - g_{i,j}u_{b,j}) \quad (5)$$

$$|u_{w,i} + ju_{b,i}| = \sqrt{u_{w,i}^2 + u_{b,i}^2} \quad (6)$$

$$= f(u_{w,i}, u_{b,i}) \quad (7)$$

$$= \sqrt{u_{w,i,o}^2 + u_{b,i,o}^2} + \frac{\delta f}{\delta u_{w,i}}du_{w,i} + \frac{\delta f}{\delta u_{b,i}}du_{b,i} \quad (8)$$

$$= \sqrt{u_{w,i,o}^2 + u_{b,i,o}^2} + \frac{u_{w,i,o}}{\sqrt{u_{w,i,o}^2 + u_{b,i,o}^2}}(u_{w,i} + u_{w,i,0}) + \frac{u_{b,i,o}}{\sqrt{u_{w,i,o}^2 + u_{b,i,o}^2}}(u_{b,i} - u_{b,i,0}) \quad (9)$$

$$i_{j,maxLoad} \leq i_j \leq 0 \quad (10)$$

$$0 \leq i_j \leq i_j, \text{maxgeneration} \quad (11)$$

$$90 \leq |u_i| \leq 110 \quad (12)$$

$$p_i = \begin{cases} 1 & \text{for } |u_i| \leq 90 + \epsilon \\ 1 & |u_i| \geq 110 + \epsilon \\ 0 & \text{otherwise} \end{cases} \quad (13)$$

$$O_{min} = \text{Min}\sum_i p_i \quad (14)$$

$$O_{max} = \text{Max}\sum_i p_i \quad (15)$$

The invention claimed is:

1. A method for determining measurement locations in an energy grid having a heterogeneous energy generator and an energy consumer structure, wherein in the energy grid use is made of a controllable device for wide-range voltage control, which comprises the steps of:
providing a model of the energy grid specifying a voltage distribution within the energy grid by means of at least one of a system of equations or a system of inequalities depending on a control position of the controllable device;
carrying out a simulation for minimizing a number of the measurement locations on a basis of the model, and as a result of the simulation a minimum number and a respective position of the measurement locations and also the control position of the controllable device are specified in order that the energy grid complies with a predefined voltage band during operation, wherein during the simulation for all control positions of the controllable device and in each case for all nodes in the energy grid, the following steps are repeated:
cancelling a condition in at least one of the system of equations or the system of inequalities that the predefined voltage band must be complied with, for a respective node;
carrying out the simulation; and
adding the respective node to a set of the measurement locations required at a minimum, if a result of the simulation reveals that the predefined voltage band was violated at the respective node; and
carrying out above steps via a computer.

2. The method according to claim 1, which further comprises installing voltage measuring devices at the respective position of the measurement locations determined in the energy grid.

3. The method according to claim 1, which further comprises setting the controllable device to the control position which requires the minimum number of the measurement locations in accordance with the result.

4. The method according to claim 1, which further comprising providing a controllable substation transformer as the controllable device.

5. The method according to claim 1, which further comprises providing a grid controller as the controllable device.

6. The method according to claim 1, which further comprises providing a controllable local grid transformer as the controllable device.

7. A configuration for determining measurement locations in an energy grid, wherein in the energy grid use can be made of a controllable device for wide-range voltage control, the configuration comprising:
a computer configured for providing a model of the energy grid, wherein the model specifies a voltage distribution within the energy grid by means of at least one of a system of equations or a system of inequalities depending on a control position of the controllable device, and a simulation for minimizing a number of the measurement locations is carried out on a basis of the model, and said computer specifying as a result of the simulation a minimum number and a respective position of the measurement locations and also the control position of the controllable device in order that a predefined voltage band can be complied with for the energy grid during operation, wherein during the simulation for all control positions of the controllable device and in each case for all nodes in the energy grid, the following steps are repeated:

cancelling a condition in at least one of the system of equations or the system of inequalities that the predefined voltage band must be complied with, for a respective node;

carrying out the simulation; and adding the respective node to a set of the measurement locations required at a minimum, if a result of the simulation reveals that the predefined voltage band was violated at the respective node.

8. A configuration, comprising:

a controllable device;

an energy grid having nodes, wherein in said energy grid use can be made of said controllable device for wide-range voltage control;

a computer configured for providing a model of said energy grid, wherein the model specifies a voltage distribution within said energy grid by means of at least one of a system of equations or a system of inequalities depending on a control position of said controllable device, and a simulation for minimizing a number of measurement locations is carried out on a basis of the model, and said computer specifying as a result of the simulation a minimum number and a respective position of the measurement locations and also the control position of said controllable device in order that a predefined voltage band can be complied with for said energy grid during operation, wherein during the simulation for all control positions of said controllable device and in each case for all said nodes in said energy grid, the following steps are repeated:

cancelling a condition in at least one of the system of equations or the system of inequalities that the predefined voltage band must be complied with, for a respective node;

carrying out the simulation; and adding said respective node to a set of the measurement locations required at a minimum, if a result of the simulation reveals that the predefined voltage band was violated at said respective node; and voltage measuring devices disposed at the respective position of the measurement locations determined in said energy grid.

9. The configuration according to claim 8, wherein said controllable device is set to the control position, the control position requires a minimum number of the measurement locations in accordance with the result.

10. The configuration according to claim 8, wherein said controllable device has a controllable substation transformer.

11. The configuration according to claim 8, wherein said controllable device has a grid controller.

12. The configuration according to claim 8, wherein said controllable device has a controllable local grid transformer.

* * * * *